United States Patent
Hardwick

[11] 3,977,614
[45] Aug. 31, 1976

[54] WINDING APPARATUS
[75] Inventor: John Gordon Hardwick, Kidderminster, England
[73] Assignee: Imperial Metal Industries (Kynoch) Limited, Birmingham, England
[22] Filed: Mar. 1, 1974
[21] Appl. No.: 447,345

[30] Foreign Application Priority Data
Mar. 7, 1973 United Kingdom............... 11152/73

[52] U.S. Cl. .................................. 242/2; 156/351; 156/446; 242/7.21; 242/158 R
[51] Int. Cl.² .................. B65H 54/64; B65H 57/04; B65H 81/08
[58] Field of Search ................. 242/2, 3, 7.21, 7.23, 242/158 R, 158.4, 158.5, 7.22; 156/446, 445, 425, 351

[56] References Cited
UNITED STATES PATENTS
| | | | |
|---|---|---|---|
| 2,153,408 | 4/1939 | Bogoslowsky | 242/3 X |
| 2,607,540 | 8/1952 | Rekettye | 242/3 |
| 3,082,140 | 3/1963 | Vanzo | 242/158.5 X |
| 3,317,146 | 5/1967 | Holman | 242/3 |
| 3,363,849 | 1/1968 | McLarty | 242/7.21 |

Primary Examiner—Billy S. Taylor
Attorney, Agent, or Firm—Cushman, Darby & Cushman

[57] ABSTRACT

A filament winding apparatus comprising an arm pivotable to traverse a filament guide longitudinally of a mandrel, the guide being pivotally mounted on the arm, and the pivotal motions of the arm and guide being derived from a common rotatable member with a phase difference such that the guide is maintained in advance of the arm in the direction of travel of the latter.

8 Claims, 6 Drawing Figures

WINDING APPARATUS

BACKGROUND OF THE INVENTION

This invention relates to winding apparatus for use in the manufacture of structures of filament-reinforced plastics or filament-reinforced elastomeric material. Typically, but not exclusively, the structure is intended to be used as a pressure vessel, for example by acting as the casing of a solid propellant rocket motor and containing the solid fuel therein. An alternative application of the structure is to provide part of a nozzle assembly for a solid or liquid propellant rocket motor.

Through the last twenty years there have been innumerable designs of winding apparatus aimed at efficiently utilising the tensile strength properties of continuous filament reinforcement materials. Many filament reinforcement materials have been used in such apparatus, examples being glass and carbon. The filament may be used in single strands or in tows of a number of strands lying together and side-by-side to form a ribbon.

Conventional helical winding apparatus usually comprises a mandrel support mechanism which is furnished with a mandrel when it is to be used, and a carriage system bearing a supply of filament. A mandrel drive and the carriage are geared together so that the carriage reciprocates parallel to the mandrel axis as the mandrel is rotated.

In this way filament can be laid on the mandrel in a helical pattern. Longitudinal reinforcement of the wound article can thereby be provided, and this can be strengthened by hoop windings if required.

The invention is particularly concerned with winding of pressure vessels having domed ends, a low length-/diameter ratio and a low helix angle. In the type of apparatus disclosed in prior U.S. Pat. No. 3,146,962, in the name of the same inventor, a low helix angle necessitates a substantial movement of the carriage carrying the filament guide beyond the ends of the mandrel. This is undesirable because the machine then occupies a substantial amount of space, and there is a substantial length of filament between the guide and the mandrel at the ends of the carriage traverse. This problem can be mitigated by using a pivotable arm to carry the filament guide, instead of a linearly movable carriage.

In winding certain pressure vessels, in particular rocket motor casings, it is desirable to carefully control the lay of filaments on the mandrel so that the helix angle is substantially constant at a predetermined designed value over the central section of the vessel. The filament guide must then be moved at a constant speed over the central section of the mandrel, but it must move relatively slowly as the filament is laid over the domed ends of the mandrel. However, with low length to diameter ratios, difficulties are encountered in designing a device for pivoting the arm to produce the required velocity characteristic.

The attainment of an accurately controlled helix angle is also facilitated by using a pivotable filament guide as disclosed in the prior United States patent. The present invention provides an elegant solution to the problem of oscillating the arm and the filament guide to give the required lay of filament for the specific type of pressure vessel referred to above.

BRIEF DESCRIPTION OF THE DRAWINGS

A typical embodiment, and a modification thereof, of the invention will now be described with reference to the accompanying diagrammatic drawings in which.

DESCRIPTION OF THE PREFERRED EMBODIMENTS

Figure 1:
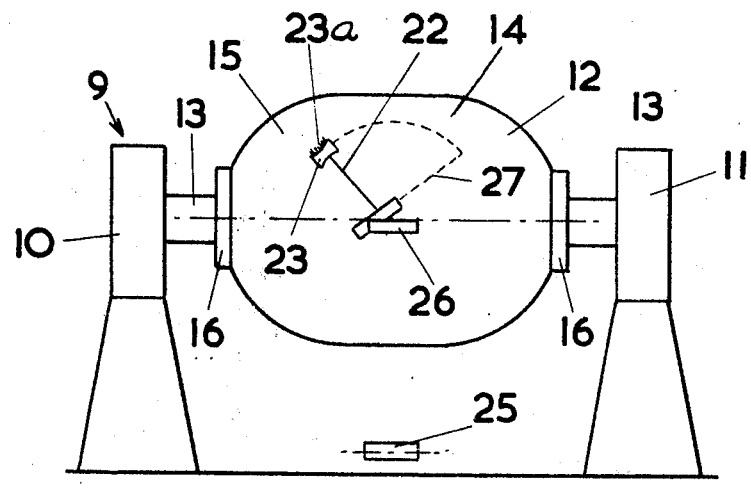
FIG. 1 is a front elevation of a winding apparatus.

Referring initially to FIGS. 1 to 4 of the drawings, the winding apparatus comprises a mandrel support mechanism 9 which comprises a headstock 10 and tailstock 11 of which the former is provided with power means (not shown) for rotating a mandrel. The power means may be an electric motor with gearing. The drawings (except FIG. 4) show a mandrel 12 in position in the apparatus, the mandrel 12 being mounted on a core 13 extending into the headstock 10 for rotation by the power means, and extending into the tailstock 11 for support. It is to be noted that the mandrel consists of a cylindrical centre section 14 at each end of which is a geodesic section 15 terminating in a collar 16 co-axial with the core 13. As will be appreciated by the man skilled in the art, the shape of each geodesic section 15 depends upon the angle at which helical windings are to be placed on the mandrel.

Coupled to the power means is an arm 17 mounted at a fulcrum 18 to one side of and beneath the mandrel 12, the arm 17 lying in and swingable in a horizontal plane so that it projects from the fulcrum 18 to a free end 19 on the opposite side of the mandrel 12 from the fulcrum 18. At a position 19a close to the free end 19, upstanding members 20a carry an approximately horizontal bar 21 which is parallel to the arm 17 and projecting away from the mandrel 12. The bar 21 is rotatable about its own axis on a spindle 21a and supports a filament feed head 22 extending thereabove. The filament feed head 22 can be swung about an axis coextensive with the horizontal bar 21. The filament feed head 22 terminates in a waisted roll 23 from which a tangent is also tangential to the mandrel at a point approximately aligned with the bar 21 when the feed head 22 is in the vicinity of the cylindrical centre section 14 of the mandrel 12.

The arm 17 and the equipment mounted thereon is provided with means for supplying filament to the roll 23. Thus, referring particularly to FIG. 4 from which the mandrel has been omitted, a group of spool carriers 28 (eight in the example shown in the drawings) is mounted in a fixed position on the opposite side of the fulcrum 18 from the mandrel 12. The fulcrum 18 is provided with a pair of fulcrum rollers 24, and aligned with the gap therebetween which receive filaments from spools on the filament spool carriers whereby the filaments pass along the arm 17, and are not affected by the angular position of the arm 17 at any particular time. At the free end 19 of the arm 17, there is provided a horizontal axis roller 25 which receives the filaments in a horizontal plane and about which the filaments can be turned to be led to a second horizontal axis roller 26 mounted between uprights 20 on the arm 17. The filaments turn around the roller 26 and can be twisted about an axis running along their length in passing to a roller 27 mounted on the filament feed head 22 and turnable therewith. From the roller 27, the filaments pass over the roll 23 and through a guide comb 23a thereon to be laid tangentially on to the mandrel 12 at a point aligned with their passage from the roller 26 to the roller 27. By these means the filament path length is substantially unaffected by either the angular displacement of the arm 17 or that of the filament feed head 22, so that operation of these parts does not effect a length displacement of the filament. The guide comb 23a controls the uniformity of the filaments across the tow and the concavity of the waisted roll 23 controls the width of the tow. Angular adjustment of the roll 23 about its axis, together with the guide comb mounted thereon, varies the width.

Figure 5:
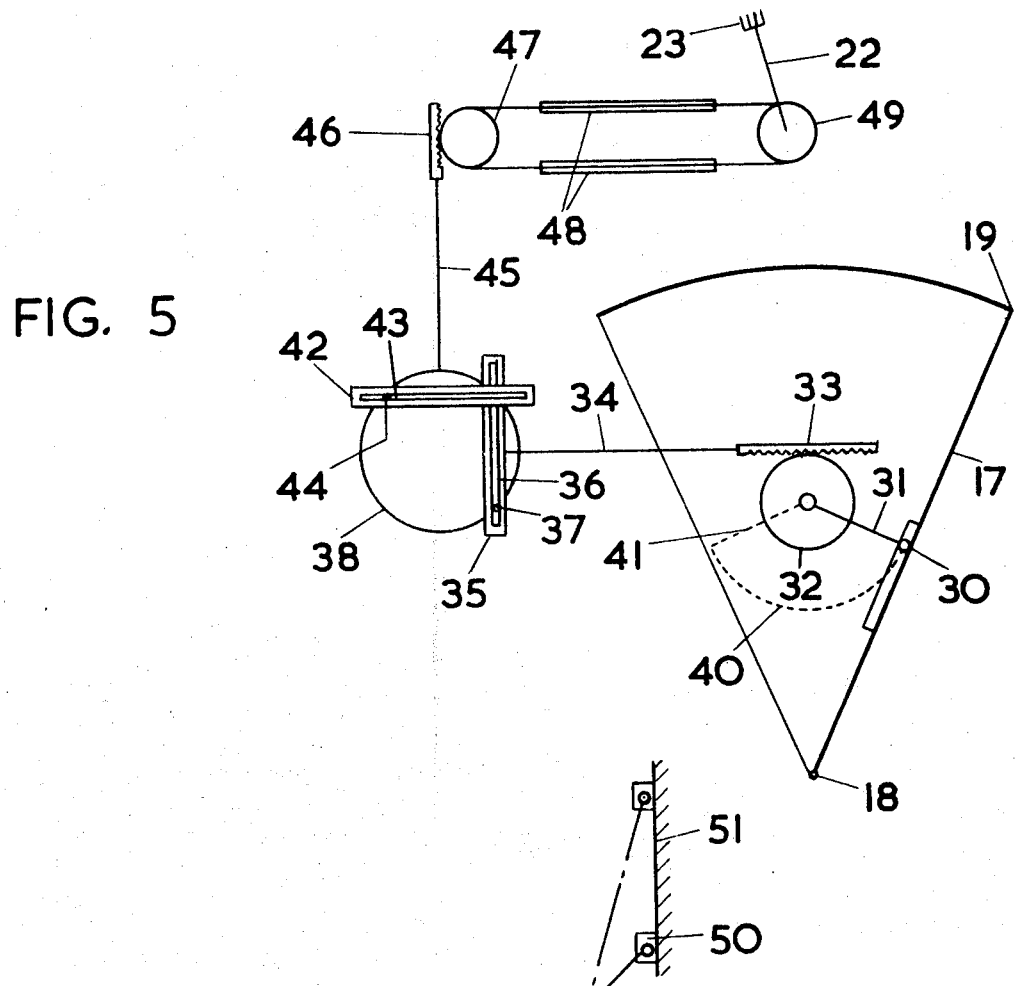
FIG. 5 is a schematic representation of the drive mechanism for the apparatus of FIG. 1.

Movement of the arm 17 is effected by the mechanism schematically shown in FIG. 5. This shows the arm 17 with its fulcrum 18 and free end 19, the arm being provided with a slider 30 which is movable radially of axis 18, 19 along a short portion of the length of the arm and is fixed to one end of a radius arm 31. The radius arm 31 is fixed to a sprocket 32 to turn therewith and about the centre of the sprocket 32. Turning is effected by a rack 33 coupled by a connecting rod 34 to a yoke 35. The yoke 35 is perpendicular to the connecting rod 34 and is provided with a longitudinal slot 36 which receives a pin 37 mounted on a wheel 38. Rotation of the wheel 38 causes circular movement of the pin 37 whereby the yoke 35 is displaced from side to side of the wheel 38 with simple harmonic motion. This motion is transmitted through the connecting rod 34 to the rack 33 to turn the sprocket 32 with that same simple harmonic motion at its periphery and therefore, in an amplified form, at the slider 30. This causes the arm 17 to turn about its fulcrum 18 with a modified simple harmonic motion. This is illustrated in FIG. 5 by the dotted line 40 which traces the path taken by the slider 30, and the dotted line 41 which shows the opposite position occupied by the radius arm 31. Hence the arm 17 is provided with a movement which is slower at its extremities than at its centre for a purpose which will be described.

It will be observed from FIG. 5 that the illustrated position of the arm 17 is the largest displacement that can be achieved, the radium arm being perpendicular to the arm 17 at that point, but that further rotation of the wheel 38 will displace the yoke 35 to an additional small degree, and the corresponding movement of the rack 33, the sprocket 32 and the radius arm 31 will then return the arm 17 to a small amount towards its central position. The end of this extra movement will take place as the pin 37 passes through a position coincident with the centre of the yoke 35. Thus the movement of the arm can be described as being rapid at its central position with a marked slow-down towards the position shown in FIG. 5, followed by a small return of a few degrees towards the central position, a displacement to its extreme position again, followed by a major swing of the arm from a slow speed to a high speed through its central position to the opposite side thereof. The half-cycle is then repeated. The feature of the small return may not be necessary and can be eliminated by shortening the radial position of the pin 37 so that the slider 30 does not pass the position shown in FIG. 5.

FIG. 5 also shows a second yoke 42 provided with a slot 43 which receives a second pin 44 mounted on the wheel 38. The second yoke 42 is coupled through a connecting rod 45 to a rack 46 which cooperates with a pinion 47 carrying cable and rod connections 48 to a pulley 49 which may be of the same diameter as that of the pinion 47. The pulley 49 is secured to the spindle 21a to the right of the bar 21 as viewed in FIG. 4, the pulley being omitted from the latter Figure for clarity of illustration. The pulley is secured to the spindle so as to rotate it. Similar to the drive means for the arm 17, the second yoke 42 will be displaced with simple harmonic motion but at a phase distance of 90° from that of the first yoke 35. This is transmitted directly to the filament feed head via pulley 49 and spindle 21a 22 so that when the arm 17 is moving with maximum velocity, i.e., in the central part of its movement, the filament feed head 22 is turning at its slowest speed, and vice versa. Double harmonic motion may be provided by using the rack 46 to turn a second wheel the same as wheel 38 for which the motion is taken by a repeat of the yoke 42, connecting rod 45 and rack 46.

The rotation of the wheel 38 is geared to rotation of the mandrel by the power means, as will be more fully described below.

There will now be described the operation of filament winding on the apparatus just described. The mandrel 12 is mounted on the core 13 between the headstock 10 and tailstock 11 of the mandrel support mechanism 9. The mandrel 12 will, of course, have been designed to have its geodesic sections 15 of the required shape for the angle of the helical windings which are to be applied to the mandrel 12 by the apparatus, and with due regard for the diameter of the collar 16 which will define open ends in the ends of the eventual article. Filament is fed into the apparatus by mounting spools thereof on the carriers 28 and passing the ends of filament between the pair of fulcrum rollers 24 and the rollers 25, 26, 27 and 23. Throughout this length, the filaments lie side-by-side to form a ribbon, and this is wrapped around one of the collars 16. The apparatus is then actuated by energisation of the power means and for convenience its functions will be described from the starting point shown in FIGS. 1 and 3 of the drawings. Thus the following operations occur simultaneously:

1. The mandrel rotates in an anti-clockwise direction as viewed in FIG. 3 and with the topmost section of the mandrel as viewed in FIG. 1 coming downwards towards and then below the filament feed head 22.
2. The arm 17 swings from centre to left as viewed in FIG. 1 and FIG. 2.
3. The filament feed head 22 begins to rise slowly from its extreme position as shown in FIG. 1 of the drawings.

It will be noted that when the apparatus is at its operational speed, the start-up position just described is that where the arm 17 is moving with its maximum velocity.

As the mandrel turns, the ribbon of filaments is led thereon in a helical pattern, being fed from the roll 23 onto a point on the mandrel which is approximately aligned with the axis of the filaments between the rollers 26 and 27.

Figure 2:
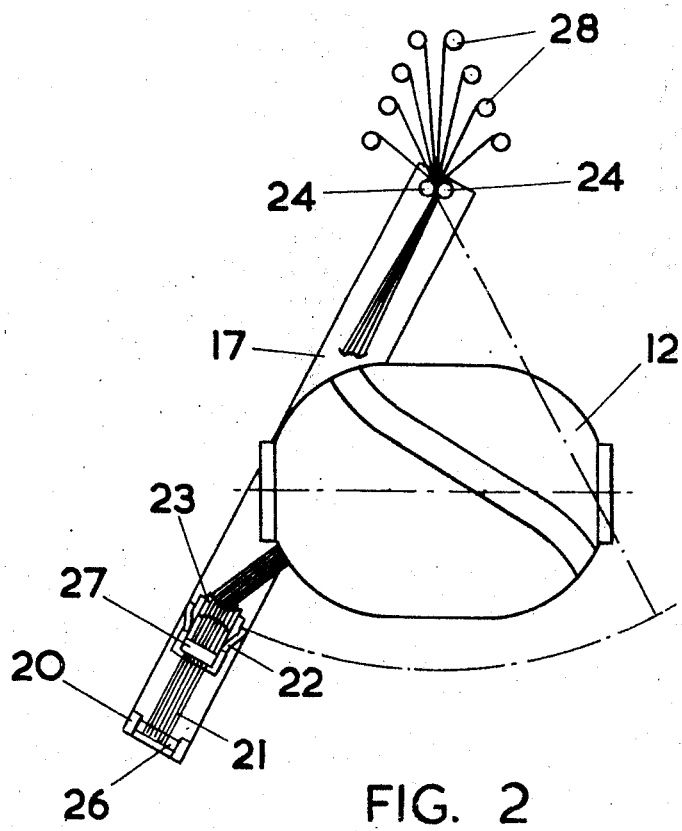
FIG. 2 is a plan view of the apparatus of FIG. 1.
Figure 3:
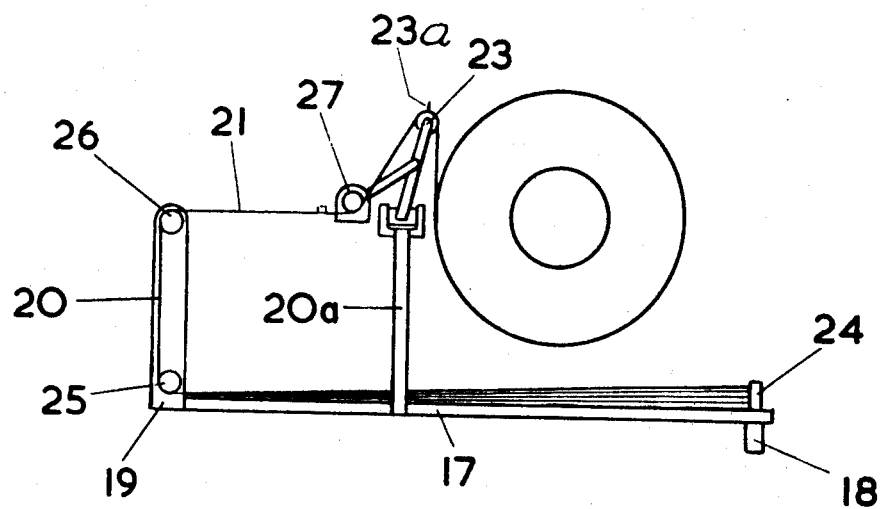
FIG. 3 is a side elevation of the apparatus of FIG. 1.
Figure 4:
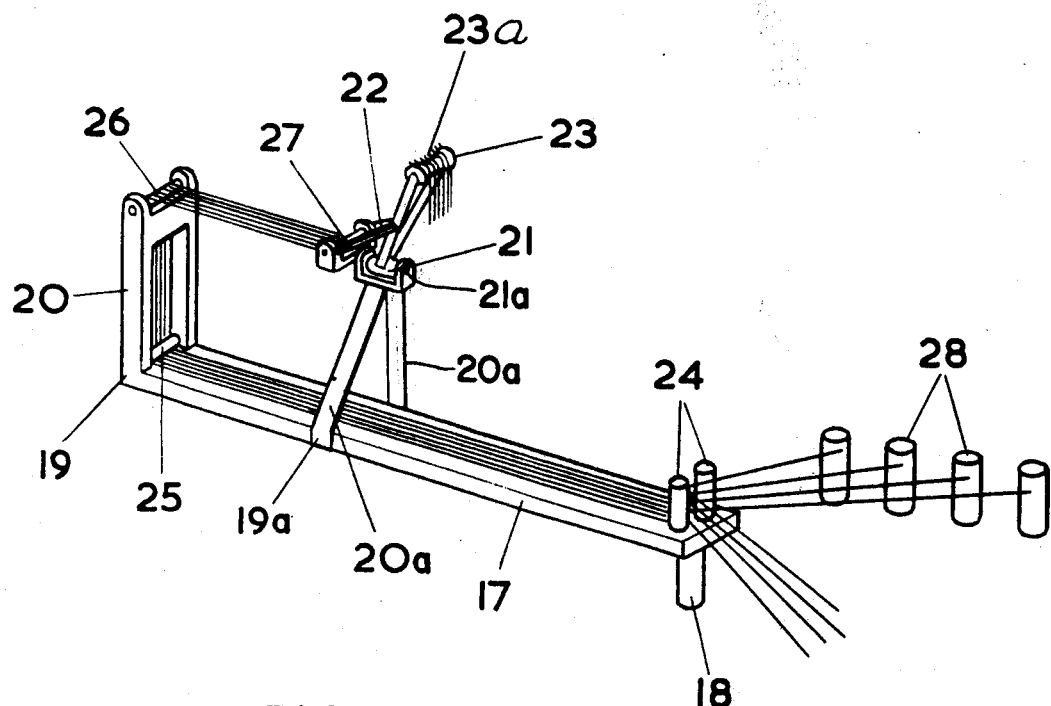
FIG. 4 is a perspective view of part of the apparatus of FIG. 1.

As the arm 17 approaches its end position, i.e., the position shown in FIGS. 2 and 5 of the drawings, it slows appreciably although the speed of rotation of the mandrel is unchanged. The arm goes through the part-cycle of becoming stationary, returning a little, moving back to its extreme position and then accelerating rapidly back towards and through its midposition. The same cycle is repeated at the other end of the mandrel.

The slow speed and the time occupied by the arm 17 at each end of its travel is provided to enable the mandrel to turn through an angle approaching 180° whilst the arm 17 is at that end. This permits the band of filaments to be laid upon the geodesic sections 15 of the mandrel in a geodesic path, and accordingly to turn around and be a tangent to the collar 16 at that end. The relatively rapid movement of the arm 17 across the centre part of its travel enables the band of filaments to be laid upon the mandrel in the cylindrical portion 14 thereof in a close approximation to a perfect helix. With the mandrel 12 rotating at a constant speed, it is obviously necessary for the arm 17 to traverse the cylindrical portion 14 of the mandrel 12 at a high speed if the band of filaments is to be laid thereon at a low helical angle, for example of the order of 20° to 25°.

The filament feed head 22 moves in concert with the arm 17, although 90° out of phase therewith as is schematically shown by the arrangement of the yokes 35 and 42 in FIG. 5. The movement is that of simple harmonic motion so that with the arm 17 in the centre position, as shown in FIG. 1, the filament feed head 22 is at the extreme position of its movement. This gives the necessary "lead" to the filament to eliminate the lag in distance between departure of the filament from the head and arrival on the mandrel and therefore allow it to be laid upon the mandrel at the point thereon aligned with the length of filament between the rollers 26 and 27. At each end of the movement of the arm 17, the filament feed head rises to the vertical position and then swings to again be in advance of the position of the point of contact of the filament with the mandrel. FIG. 1 shows the filament feed head 22 in position for traverse of the arm towards the left of the drawing. Shown in dashed lines is the position of the filament feed head 22 when the arm is moving towards the right-hand side of the drawing. The arc traversed by the roll 23 is also shown in dashed lines. It should also be noted that the swinging motion of the arm 17 also keeps the roll 23 in a better face-to-face relationship with the surface of the mandrel than rectilinear movement to provide less distortion of the ribbon of filaments before it is laid on the mandrel.

The invention is particularly applicable to the manufacture of wound articles which have a relatively low ratio between their length and diameter. Thus the arcuate passage of the filament feed head 22 approximates to the external surface of the mandrel, and at no point is the roller 23 a large distance away from the mandrel surface. This can be contrasted with the prior art method of having a filament feed head which moves along a rectilinear path in which case the manufacture of a wound article having a relatively low ratio between its length and its diameter could necessitate displacement of the filament feed head along its rectilinear path a substantial distance away from the mandrel surface whilst the band of filaments is being laid around the geodesic end portions of the mandrel. The winding of this portion of the pattern does not take up a very large length of filament so that return of the filament feed head along its rectilinear path when the geodesic end pattern has been half-completed involves the winding back of the unused filament between the filament feed head and the mandrel surface. This poses particular problems, especially as regards abrasion of the filament.

Figure 6:
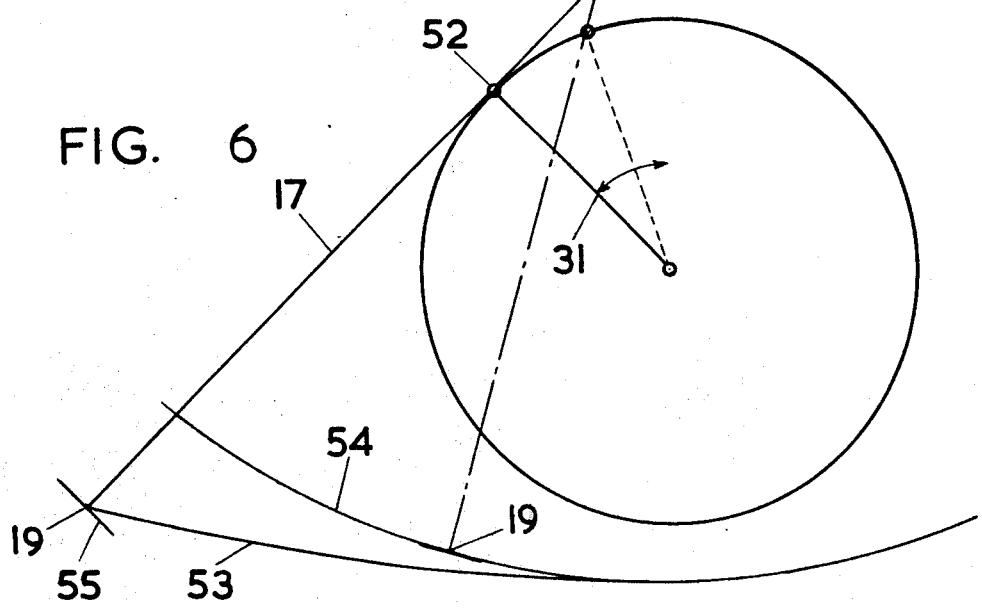
FIG. 6 is a modification.

Reference is now made to FIG. 6 of the drawings in which there is shown a modified mounting from the arm 17. Thus in this case the arm 17 is not attached to a fixed fulcrum, but rather to a moving fulcrum plate 50 mounted on a slideway 51. The radius arm 31 is attached to the arm 17 at a fixed hinge point 52. Traverse of the radius arm 31 under the action of the rack 33 causes the arm 17 to swing and also effects movement of the fulcrum plate 50 along the slideway 51 so that the free end 19 of the arm 17 follows the flattened curve 53 shown in FIG. 6. This curve can be compared with the curve 54 followed by the free end 19 of the arm 17 when the system of FIGS. 1 to 5 of the drawings is used, i.e., with the fulcrum of the arm 17 fixed at the most remote position that can be occupied by the fulcrum plate 50 on the slideway 51. It will also be observed that the plane normal to the radius arm 17, i.e., the plane in which the filament feed head swings, is directed inwardly to a greater degree at each extreme position of the arm 17 than that which occurs when the arm 17 has a fixed fulcrum; in the latter case this plane is tangential to the curve 54. The respective planes are denoted as 55 for the modified mounting of the arm 17, and 56 for the unmodified form respectively. There is also obtained bigger swing of the arm to give freedom to the filaments to find their natural positions on the geodesic sections of the mandrel. Square-end mandrels can also be wound with this apparatus.

In a further modification, the horizontal bar 21 is adapted to be adjustable towards or away from the fulcrum 18 to cope with various mandrels of similar shape but different size. Examples of ways of doing this are firstly mounting the horizontal bar on a slide, and secondly tilting the upstanding members 20a towards or away from the fulcrum 18 as indicated in dotted lines on FIG. 3. In the latter arrangement, provision must be made for vertical adjustment of the axis of the mandrel, also as indicated in dotted lines, to make sure that a tangent from the waisted roll 23 is also tangential to the mandrel at a point aligned with the bar 21.

I claim:
1. A filament winding apparatus comprising:
   a mandrel mounting for receiving a mandrel on which an article is to be wound and for rotating a received mandrel about an axis thereof; an arm; a pivot mounting for the arm; a filament guide carried on the arm for pivotal movement relative to the arm about an axis extending longitudinally thereof; a member arranged to be driven in rotation about an axis; a first drive transmission connecting said member to said arm to cause the arm to pivot on its pivot mounting and thereby to cause the filament guide to move generally longitudinally of a mandrel on said mandrel mounting; and a further drive transmission connecting the member and the filament guide to pivot the guide relative to the arm with a predetermined phase difference relative to the pivot motion of the arm such as to maintain the guide in a position in advance of the arm in the direction of travel of the latter.

2. Apparatus as claimed in claim 1 wherein said phase difference is 90°.

3. Apparatus as claimed in claim 1 wherein said drive transmissions comprise respective slider members slidably engaged with respective projections on the rotary member so that the slider members are driven with linear simple harmonic motion as the rotary member is rotated.

4. Apparatus as claimed in claim 3 wherein the first drive transmission comprises means for converting the linear motion of the slider member to rotary motion of a link connected to the arm so that the velocity of the arm past the central portion of a mandrel is substantially constant.

5. Apparatus as claimed in claim 4 wherein the pivot mounting for the arm is fixed, and the link is slidably connected to the arm.

6. Apparatus as claimed in claim 4 wherein the pivot mounting is slidable relative to a support and the link is rigidly connected to the arm.

7. Apparatus as claimed in claim 4 wherein the link is connected to its associated slider member by a rack and pinion device.

8. Apparatus as claimed in claim 1 wherein the arm extends across the rotation axis of the mandrel, there being guide rollers at the free end of the arm for returning filament fed along the arm, the returned filament passing to said filament guide.

* * * * *